W. H. HANCE.
COTTON THINNING AND WEEDING MACHINE.
APPLICATION FILED NOV. 21, 1907.
906,223.
Patented Dec. 8, 1908.
3 SHEETS—SHEET 1.
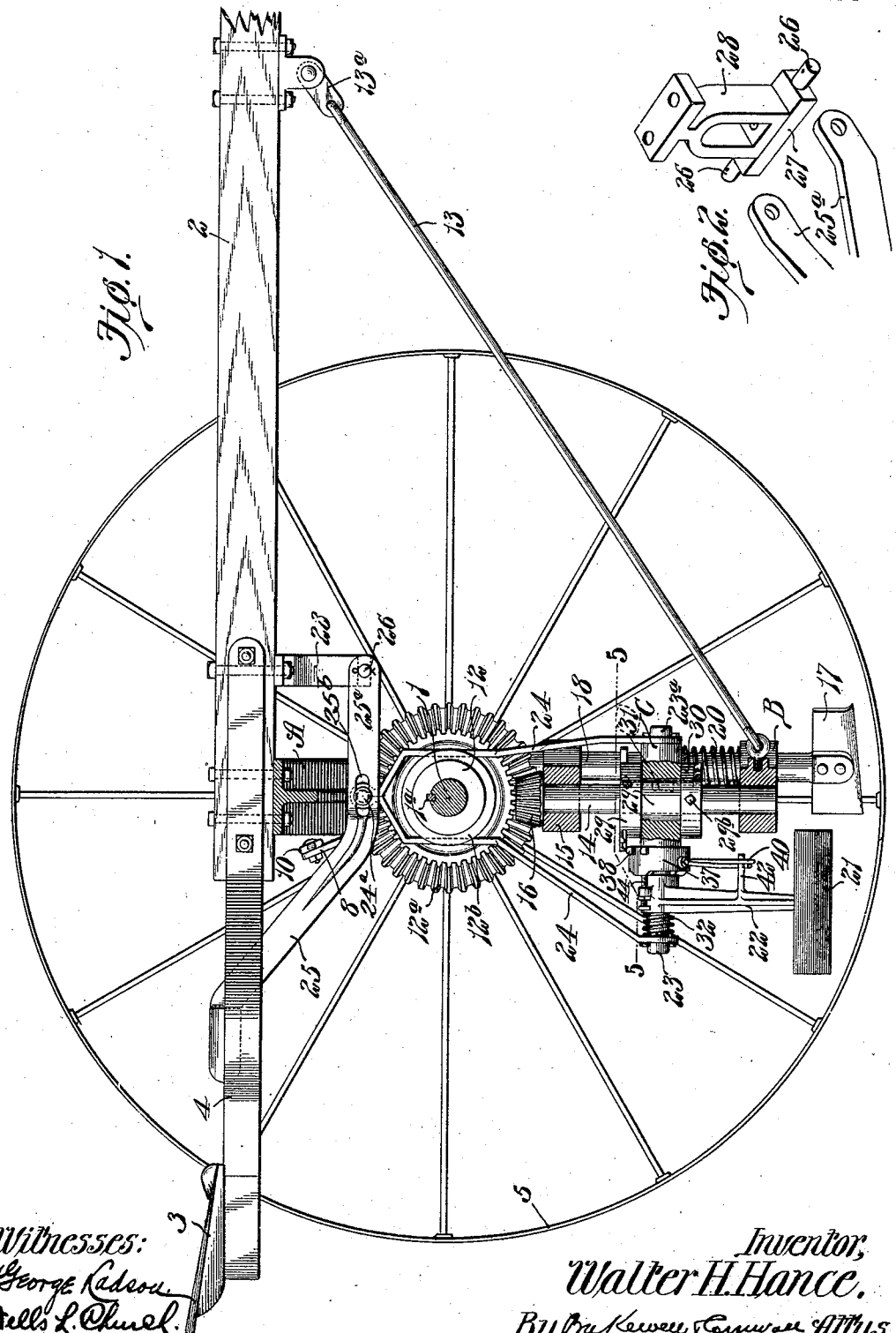
Witnesses:
George Radson
Nells L. Church
Inventor,
Walter H. Hance.
By Bakewell Cornwall Attys.

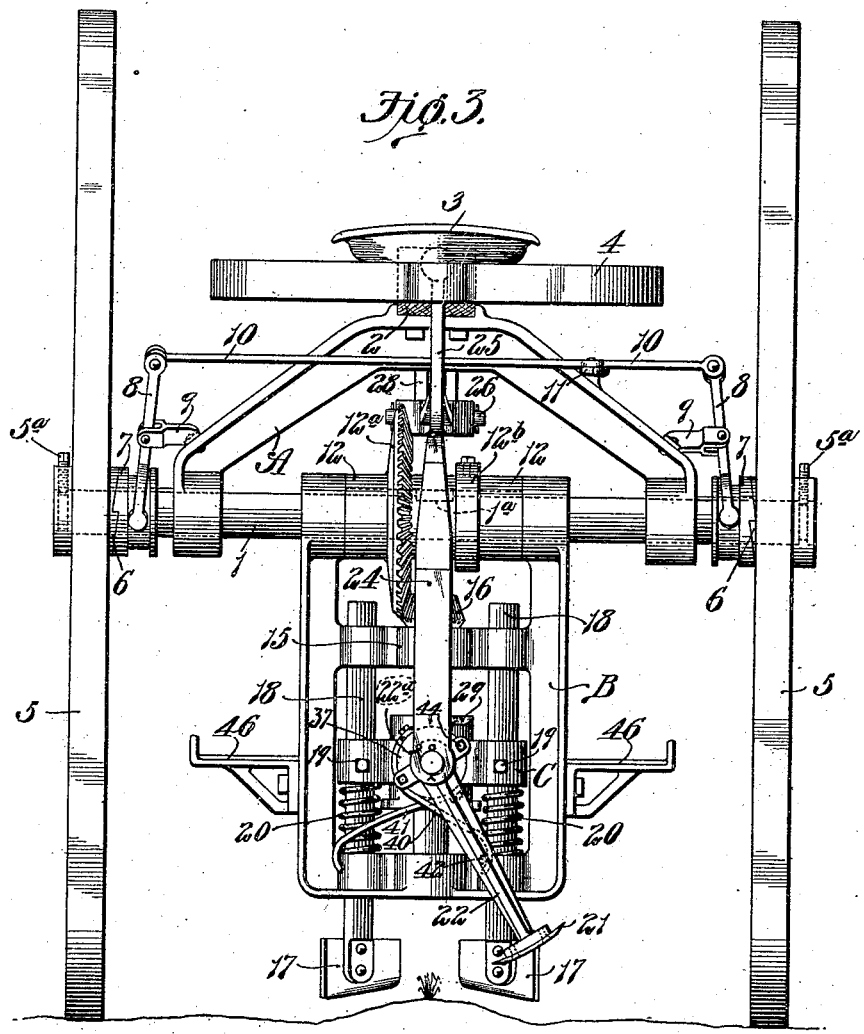

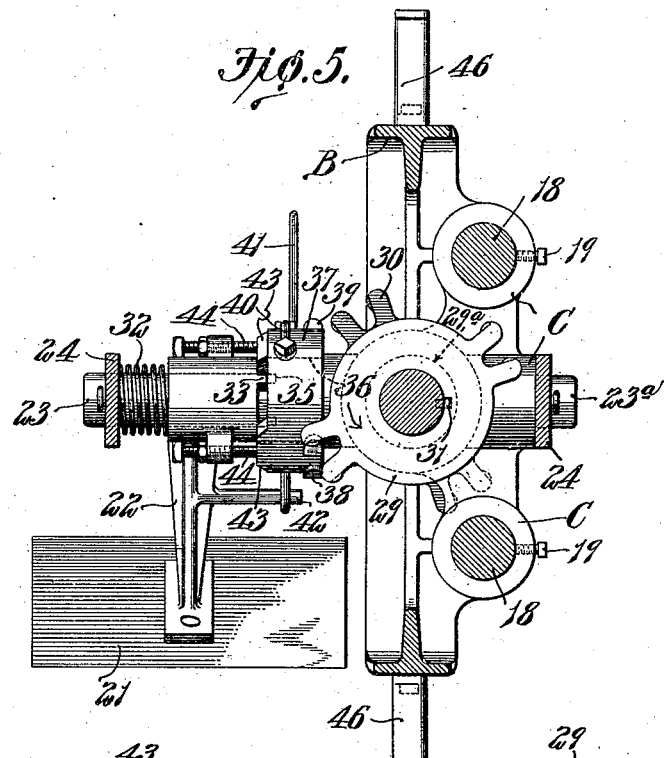
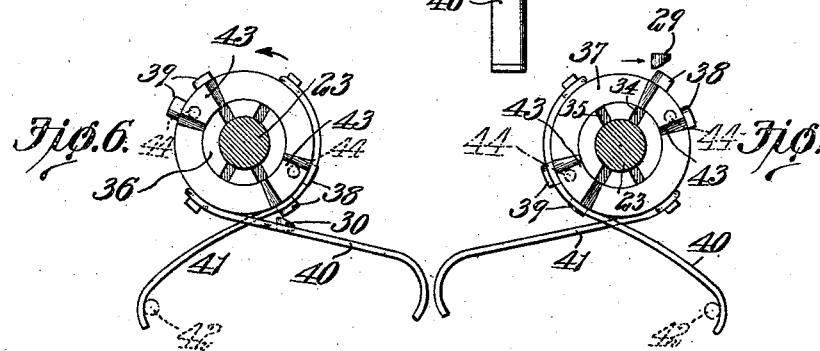
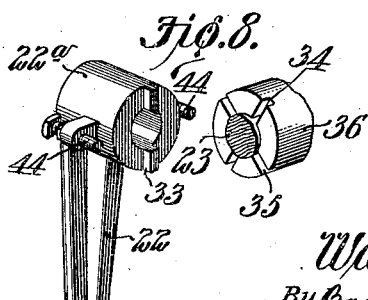

UNITED STATES PATENT OFFICE.

WALTER HEARST HANCE, OF ST. LOUIS, MISSOURI.

COTTON THINNING AND WEEDING MACHINE.

No. 906,223.      Specification of Letters Patent.      Patented Dec. 8, 1908.

Application filed November 21, 1907. Serial No. 403,147.

*To all whom it may concern:*

Be it known that I, WALTER H. HANCE, a citizen of the United States, residing at No. 5842ᴀ Page avenue, St. Louis, Missouri, have invented a certain new and useful Improvement in Cotton Thinning and Weeding Machines, of which the following is a full, clear, and exact description, such as will enable others skilled in the art to which it appertains to make and use the same, reference being had to the accompanying drawings, forming part of this specification, in which—

Figure 1 is a vertical sectional view of a machine constructed in accordance with my invention; Fig. 2 is a detail perspective view of the supporting means for the manually-operated lever that controls the member which carries the scraping and cutting devices; Fig. 3 is a rear elevation of the machine; Fig. 4 is a detail top plan view of the lever that operates the clutches which connect the axle to the wheels; Fig. 5 is a horizontal cross sectional view taken on the line 5—5 of Fig. 1; Fig. 6 is a detail view of the oscillating sleeve that is provided with spring arms for actuating the cutting device; Fig. 7 is a detail view showing said sleeve in a different position; and Fig. 8 is a detail perspective view of the arm that carries the cutting device and shows the means that locks said arm at the end of its stroke.

This invention relates to agricultural machines or implements, and particularly to machines that are employed for cutting or removing some of the plants in a row of growing plants so as to thin out the row and thus provide sufficient space for the plants to spread out.

The machine herein shown is designed particularly for thinning out rows of cotton plants but it will, of course, be understood that it could be used for thinning out rows of any kind of growing plants without departing from the spirit of my invention.

One object of my invention is to provide a machine for the purpose described which is provided with means for scraping or removing the dirt and weeds adjacent the plants of the row and means for cutting alternate plants or clusters of plants in the row so as to form spaces between the plants or clusters of plants that have not been cut and thus permit the plants to spread out.

Another object of my invention is to provide a machine of the character described having scraping and cutting devices and means for positioning said devices properly relatively to the plants of a row.

Another object of my invention is to provide a machine of the character described having scraping and cutting devices carried by a movable member and means under control of the operator for raising and depressing said member and also for moving it laterally so as to position the scraping and cutting devices properly relatively to the row of plants on which the machine is operating. And still another object of my invention is to provide a machine of the character described which is provided with an automatically operated cutting device that cuts off some of the plants of a row, then skips some of the plants, and then cuts off some of the succeeding plants and so on until the end of the row is reached.

Other desirable features of the machine herein illustrated as embodying my invention will be hereinafter pointed out.

My improved machine consists of a frame mounted on wheels and propelled either by mechanical means or horse-power, a movable member carried by said frame and adapted to be moved laterally and also raised and lowered, means for operating said member, scrapers carried by said member for removing the dirt and weeds adjacent the plants, a cutting device carried by said member, and means for operating said cutting device intermittently.

Referring to the drawings which illustrate the preferred form of my invention, A designates a frame in which an axle 1 is rotatably mounted, and 2 designates a pole or tongue that is connected to said frame, a seat 3 for the operator being carried by a member 4 which is secured to the pole 2, as shown in Fig. 1. Wheels 5 are loosely mounted on the axle 1 and are prevented from moving longitudinally of the axle by means of pins 5ᵃ that project into grooves in the axle, as shown in Fig. 3. The hub of each wheel is provided with a clutch 6, and the axle is provided with coöperating sliding clutch members 7 that connect the wheels and axle together and thus cause the axle to rotate with the wheels. The clutch members 7 are splined to the axle and the hubs of said clutch members are provided with grooves which receive projections on the ends of pivotally mounted levers 8 carried by brackets 9 on the frame A, as shown in Fig. 3, said levers being connected by links 10 to a manually-operated lever 11 on the frame A so that the operator can connect the axle and wheels together or disconnect them. Any suitable means may be used for holding the lever 11 in either of its positions, and in the construction herein shown the lever is provided with two holes that coöperate with a pin 11ª on the support for said lever.

An approximately U-shaped frame B is loosely mounted on the axle so that it depends therefrom, as shown in Fig. 3, and a hub 12 provided with a bevel gear 12ª is mounted on the axle 1 between the upper ends of said frame B, thereby causing the gear 12ª to move longitudinally of the axle with the frame B as hereinafter described. The frame B is held in substantially a vertical position by means of a link 13 connected at its upper end to the pole 2 and at its lower end to said frame. A vertically disposed shaft 14 is journaled in the lower portion of the frame B and also in a cross-piece 15 adjacent the upper end of said frame, and said shaft is provided with a bevel gear 16 that meshes with the gear 12ª on the axle 1, as shown in Fig. 1. The axle is provided with a key 1ª, shown in dotted lines in Fig. 3, that enters an elongated slot in the hub 12 of gear 12ª thus securing said gear to the axle but permitting it to move longitudinally thereof.

A vertically movable member or cross-head C is arranged inside of the frame B for carrying the scraping and cutting devices, and means is provided for raising and lowering said cross-head and also moving it laterally to position the scraping and cutting devices properly relatively to the row of plants on which the machine is operating. The machine herein shown is provided with two scraping devices 17 each of which is connected to the lower end of a shank or rod 18 that passes upwardly through the cross-head C and is adjustably connected thereto by a set screw 19 or other suitable fastening device. The shanks 18 extend through bearings in the frame B and form guides for the cross-head C, and coiled expansion springs 20 surround said shanks between the cross-head and the lower portion of the frame B to normally hold said cross-head in an elevated position. The scrapers 17 are arranged side by side, as shown in Fig. 3, and are set at an angle of about 55° to the center line of the row of cotton plants so that they will remove dirt and weeds from both sides of the row and thus leave only a small amount of dirt for the cutting device to pass through when it cuts off the plants.

The cutting device consists of a two-edge blade or hoe 21 fastened to the lower end of an arm 22 that is oscillatingly mounted on a horizontal stub shaft 23 which projects rearwardly from the cross-head C, and on the front side of said cross-head is a stub shaft or projection 23ª, as shown in Fig. 1. A yoke 24 which embraces the hub 12 of the gear on the axle 1, is connected to said stub shafts 23 and 23ª, as shown in Fig. 1, and the upper end of said yoke is pivotally connected to a manually-operated lever 25 that is adapted to be depressed to move the cross-head downwardly and thus bring the scraping and cutting device into operative position, the pivotal connection between the yoke 24 and lever 25 consisting of a cross pin 24ª at the upper end of the yoke which projects laterally through elongated slots 25ᵇ in the lever 25, as shown in dotted lines in Fig. 1. The lever 25 is provided at its front end with jaws 25ª having openings through which trunnions 26 on a block 27 extend, and said block is pivotally connected to a bracket 28 on the underneath side of the pole 2, as shown in Figs. 1 and 2, thereby permitting said lever 25 to be depressed and also moved laterally or from side to side. The portion of the yoke 24 which embraces the hub 12 on the axle is arranged between the gear 12ª and a collar 12ᵇ on said hub so that when the lever 25 is moved laterally the frame B and the parts mounted thereon will also move laterally, thereby enabling the operator to position the scraping and cutting devices properly relatively to the plants.

The vertically disposed shaft 14 which is driven by the gear 12ª on the axle extends through the cross-head C, as shown in Fig. 1, and is provided with two mutilated gears 29 and 30, the gear 29 being arranged above the cross-head and the gear 30 being arranged below the cross-head. The gear 29 is provided with a depending hub 29ª which surrounds the shaft 14 and the gear 30 is permanently connected to said hub in some suitable manner such, for example, as by a set screw 29ᵇ, as shown in Fig. 1. A tongue or key 31 on the shaft 14 projects into an elongated slot on the inside of the hub 29ª so that the gears 29 and 30 will rotate with the shaft 14 and can also move longitudinally of said shaft as the cross-head C is raised and lowered.

As previously stated, the cutting device is connected to an arm 22 that is loosely mounted on the stub shaft 23, and a coiled expansion spring 32 which surrounds said shaft between the arm 22 and the portion of the yoke 24 through which the stub shaft 23 extends, operates to force the arm 22 forwardly and thus cause a rib 33 on the hub 22ª of said arm to project into coöperating slots or grooves 34 and 35 formed in an enlarged portion 36 of the stub shaft 23, so as to lock said arm in an elevated position.

A sleeve 37 provided with two sets of teeth 38 and 39, is oscillatingly mounted on the enlarged portion 36 of the stub shaft 23 and the teeth on the mutilated gears 29 and 30 coöperate with the teeth on the sleeve 37 to oscillate said sleeve first in one direction and then in the opposite direction. Spring arms 40 and 41 are connected to said sleeve 37 and project downwardly therefrom so as to engage a forwardly projecting pin 42 on the arm 22 which carries the cutting device. The sleeve 37 is provided on its rear face with cams 43 which coöperate with adjustable stops 44 on the hub of arm 22 so that when the sleeve 37 oscillates said cams will engage the stops 44 and thus move the arm 22 rearwardly to disengage the rib 33 on the hub $22^a$ from the locking groove into which it projects.

The locking grooves 34 and 35 in the enlarged portion of the stub shaft 23 are so disposed that when the rib 33 on the hub of the arm 22 projects into either of said grooves the cutting device 21 on said arm will be arranged at one side of the row of cotton plants, as shown in Fig. 3. When the vertically disposed shaft 14 revolves the teeth of the mutilated gear 29 on said shaft will engage the teeth 38 on the sleeve 37 and thus oscillate said sleeve in the direction indicated by the arrow in Fig. 7 and consequently place the spring arm 40 under tension, due to the fact that said spring arm engages the pin 42 on the arm 22, said arm being locked by the rib 33 which projects into the groove 34. After the sleeve 37 has moved a certain distance the cams 43 thereon will engage the stops 44 on the hub of the arm 22 and thus move said arm rearwardly so as to disengage the rib 33 from the groove 34. As soon as the arm 22 has been released the spring arm 40 which has been placed under tension will spring back to its normal position and thus move the arm 22 laterally so that the cutting device 21 will sever the cotton plants which lie in its path of movement, the arm 22 being locked when it finishes its stroke by means of the locking groove 35 into which the rib 33 is forced by the expansion of the spring 32. The cutting device 21 will now be arranged on the opposite side of the row of cotton plants and as the shaft 14 continues to revolve the teeth of the other mutilated gear 30 on said shaft engage the teeth 39 on the sleeve 37 and oscillate said sleeve in the direction indicated by the arrow in Fig. 6, thereby placing the spring arm 41 under tension and also causing the cams 43 to engage the stops 44 so as to release the arm 22 and thus permit the spring 41 to swing said arm in the opposite direction so that the cutting device 21 will chop off the cotton plants which lie in its path, the arm 22 being locked in the position shown in Fig. 3 when it completes its stroke. These operations are repeated while the shaft 14 continues to revolve, the cutting device 21 swinging automatically from one side to the other and cutting off a number of cotton plants at each stroke or operation. The mechanism for the cutting device is so timed that said device will cut off a number of plants, then skip a number of plants, and then cut off a number of plants, thereby forming spaces between the plants or cluster of plants that the cutting device has not operated on.

I prefer to provide the frame B with laterally projecting foot-rests 46 on which the operator places his feet so that he can use his legs in addition to the lever 25 to move the frame B laterally and thus position the scraping and cutting devices properly. Another advantage of providing the frame B with foot-rests 46 is that the operator can push said frame forwardly in case he sees that the cutting device is not going to strike the row of plants at the proper place, the rod 13 which holds the frame B in vertical position being provided at its upper end with a link $13^a$ that permits the frame B and rod 13 to move forwardly. When the machine is operating on a row of plants the operator keeps the lever 25 depressed so as to cause the scraping devices 17 to remove the dirt and weeds from each side of the row and when he releases said lever the springs 20 will move the cross-head C upwardly and thus carry the scraping and cutting devices into an inoperative position. By shifting the lever 11 the operator can disconnect the axle from the wheels so that said axle and the cutting and scraping devices will remain at rest while the wheels 5 continue to revolve.

While I have herein shown a machine that is adapted to be propelled by horse-power, it will, of course, be obvious that the machine could be propelled by mechanical means and provided with four instead of two wheels.

Having thus described my invention, what I claim as new and desire to secure by Letters Patent is:

1. A machine for the purpose described provided with a scraping device for removing the dirt and weeds adjacent to the rows of plants, a cutting device, means for operating said cutting device intermittently to cut alternate plants or clusters of plants, and means for simultaneously positioning said scraping device and cutting device vertically and horizontally relatively to the row of plants on which they are operating; substantially as described.

2. A machine for the purpose described provided with a scraping device for removing the dirt and weeds adjacent to the rows of plants, a cutting device, means for operating said cutting device intermittently to cut alternate plants or clusters of plants, and manually controlled means for simultaneously moving said scraping device and cutting device laterally to position them properly relatively to the row of plants on which they are operating; substantially as described.

3. A machine for the purpose described provided with a scraping device for removing the dirt and weeds adjacent to the rows of plants, a cutting device, means for operating said cutting device intermittently to cut alternate plants or clusters of plants, means for simultaneously moving said scraping and cutting devices downwardly into an operative position, and means for simultaneously moving said devices laterally to position them properly relatively to the row of plants on which they are operating; substantially as described.

4. A machine for the purpose described provided with a scraping device and a cutting device, a member which carries said devices, and means for simultaneously raising and depressing said member and also moving it laterally to position the cutting device and scraping device; substantially as described.

5. A machine for the purpose described provided with a pivotally mounted cutting device, an oscillating member provided with yielding arms that engage the shank of the cutting device and move it in opposite directions, means for holding the cutting device at rest while said oscillating member is moving so as to store up energy in said spring arms, and means for thereafter releasing the cutting device so that it can be actuated; substantially as described.

6. A machine for the purpose described provided with a pivotally mounted arm having a cutting device, means for locking said arm to hold the cutting device in an elevated position, an oscillating member provided with a pair of spring arms that engage a projection on the arm of the cutting device and move said arm in opposite directions, means for moving said oscillating member while the cutting device remains at rest so as to store up energy in the spring arm which is then in engagement with the projection on the arm of the cutting device, and means for disengaging the cutting device from its locking means when said oscillating member reaches a certain position; substantially as described.

7. A machine for the purpose described, comprising a pivotally mounted cutting device, an oscillating member provided with a pair of spring arms that are adapted to engage the shank of said cutting device and move it into engagement with the object on which it operates, and means for placing said spring arms under tension; substantially as described.

8. A machine for the purpose described, comprising a rotating shaft, a member which said shaft oscillates, a pivotally mounted cutting device, means for locking said cutting device in an elevated position, and means operated by said oscillating member for releasing said cutting device and for imparting movement thereto; substantially as described.

9. A machine for the purpose described, comprising a rotating shaft, a movable member or cross-head mounted on said shaft and provided with a stub shaft, a cutting device connected to an arm that is loosely mounted on said stub shaft, means for holding said arm in an elevated position, a sleeve loosely mounted on said stub shaft and provided with spring arms which are adapted to engage the arm that carries the cutting device, and means operated by said rotating shaft for imparting an oscillating movement to said sleeve; substantially as described.

10. A machine for the purpose described provided with a rotating shaft, a member through which said shaft extends, an arm pivotally mounted on a projection on said member and provided with a cutting device, coöperating locking means on said member and on the arm of the cutting device, yielding means for holding said coöperating locking means in engagement with each other, an oscillating member provided with spring arms which are adapted to engage a projection on the arm of the cutting device, cams on said oscillating member which engage stops on the arm of the cutting device and release said arm from its locking means, and means operated by said rotating shaft for imparting movement to said oscillating member; substantially as described.

11. A machine for the purpose described, comprising a rotatable shaft, a cross-head through which said shaft extends, an arm loosely mounted on a projection on said cross-head and provided with a cutting device, an oscillating sleeve mounted on said cross-head and provided with spring arms which are adapted to engage the arm of the cutting device to move same, mutilated gears on the rotating shaft coöperating with teeth on said oscillating member to move same intermittently in opposite directions, a rib or tooth on the arm of the cutting device which coöperates with grooves or recesses on said cross-head to retain the cutting device in an elevated position, yielding means for forcing said rib into one of said recesses, and cams on said oscillating device for moving the arm of the cutting device so as to disengage the rib thereon from its coöperating recess on the cross-head; substantially as described.

12. A machine for the purpose described provided with a rotating shaft having a pair of mutilated gears, a member provided with pairs of teeth which are engaged intermittently by said mutilated gears so as to positively oscillate said member in opposite directions, yielding arms carried by said member, and a pivotally mounted cutting device which said yielding arms actuate intermittently to force it into engagement with the object on which the cutting device operates; substantially as described.

13. A machine for the purpose described provided with an axle upon which wheels are mounted, a frame loosely mounted on said axle and adapted to be moved longitudinally thereof, a movable cross-head arranged inside of said frame, a cutting device carried by said cross-head, scraping devices carried by said cross-head and means under control of the operator for raising and depressing said cross-head and for moving said frame longitudinally of the axle to position the cutting device and scraping devices simultaneously; substantially as described.

14. A machine for the purpose described provided with an axle upon which wheels are mounted, means for causing said axle to rotate with the wheels, a frame loosely mounted on the axle and adapted to be moved longitudinally thereof, a movable cross-head arranged in said frame, an oscillating cutting device carried by said cross-head, a shaft journaled in said frame and provided with a gear that meshes with a gear on the axle of the machine, and means operated by said shaft for oscillating said cutting device; substantially as described.

15. A machine for the purpose described provided with an axle on which wheels are mounted, a frame depending from said axle and loosely mounted thereon, a cross-head arranged in said frame, agricultural implements carried by said cross-head, yielding means for holding said cross-head in an elevated position, and manually-operated means for depressing said cross-head to carry said implements into an operative position; substantially as described.

16. A machine for the purpose described provided with an axle, a frame loosely mounted on said axle and depending therefrom, foot-rests connected to said frame, a cross-head arranged in said frame, scraping devices and a cutting device carried by said cross-head, means for actuating said cutting device intermittently, and manually-operated means for depressing said cross-head and for moving said frame laterally so as to simultaneously position the cutting device and scraping device; substantially as described.

17. A machine for the purpose described, comprising a member which carries a cutting device, means for operating said cutting device intermittently, yielding means for holding said member in an elevated position, a manually-operated lever, and a yoke pivotally connected to said lever and also connected to the cross-head for moving said cross-head downwardly; substantially as described.

WALTER HEARST HANCE.

Witnesses:
WALTER WICKENDEN,
WILLIAM BAST HANCE.